United States Patent [19]
Mizutani et al.

[11] Patent Number: 5,860,323
[45] Date of Patent: Jan. 19, 1999

[54] VARIABLE-PITCH RACKED BAR

[75] Inventors: Ichiro Mizutani, Aichi-ken; Hirotaka Umeda, Komaki, both of Japan

[73] Assignee: TRW Steering Systems Japan Co. Ltd, Aichi-ken, Japan

[21] Appl. No.: 701,856

[22] Filed: Aug. 23, 1996

[30] Foreign Application Priority Data

Sep. 26, 1995 [JP] Japan ................................ 7-247505

[51] Int. Cl.⁶ ........................................................ B62D 3/12
[52] U.S. Cl. .................... 74/422; 74/498; 74/462
[58] Field of Search ............................ 74/422, 498, 462

[56] References Cited

U.S. PATENT DOCUMENTS

| | | | |
|---|---|---|---|
| 3,753,378 | 8/1973 | Bishop | 74/422 |
| 4,133,221 | 1/1979 | Clary | 74/498 |
| 4,444,070 | 4/1984 | Yanai | 74/422 |
| 4,598,451 | 7/1986 | Ohki | 74/422 X |
| 4,619,155 | 10/1986 | Futaba | 74/498 |
| 4,890,683 | 1/1990 | Matsuda et al. | 74/422 X |

FOREIGN PATENT DOCUMENTS

| | | |
|---|---|---|
| 462162 | 5/1975 | Australia . |
| 550194 | 3/1986 | Australia . |
| 572105 | 12/1993 | European Pat. Off. . |
| 3612048A1 | 10/1987 | Germany . |
| 52-29049 | 7/1977 | Japan . |
| 57-73268 | 5/1982 | Japan ............................ 74/498 |

OTHER PUBLICATIONS

Patent Abstract of Japan, vol. 6, No. 83 (M–130), May 21, 1982 and JP 57022454 A (Nissan), Feb. 5, 1982.

Patent Abstract of Japan, vol. 4, No. 94 (M–19), Jul. 8, 1980, and JP55 051161A (Nippon Seiko), Apr. 12, 1980.

*Primary Examiner*—Charles A. Marmor
*Assistant Examiner*—David Fenstermacher
*Attorney, Agent, or Firm*—Tarolli, Sundheim, Covell, Tummino & Szabo

[57] ABSTRACT

A variable-pitch racked bar has a row of rack teeth with a middle fixed pitch region and two end fixed pitch regions. A variable-pitch region is interposed between the middle fixed pitch region and each of the end fixed pitch regions. In the variable-pitch region, the pitch increases from the fixed, small-pitch middle region toward the fixed, large-pitch end regions. In the variable-pitch racked bar, the effective meshing width continuously decreases from the middle of the row of rack teeth toward both ends thereof.

10 Claims, 3 Drawing Sheets

VARIABLE-PITCH RACKED BAR

FIELD OF THE INVENTION

This invention relates to a racked bar for use in a vehicle steering device in general, and more particularly to a variable-pitch racked bar in which the pitch is gradually increased or decreased in at least one portion of a row of rack teeth.

BACKGROUND OF THE INVENTION

A variable-pitch racked bar, as disclosed in Japanese examined and published patent application No. 52-29049, has a variable-pitch tooth profile or VGR tooth profile, in which the pitch gradually increases or decreases along a row of rack teeth. In a first arrangement, the pitch of the middle teeth is set at a minimum and the pitch is gradually increased from the middle teeth toward both ends of the row of rack teeth. This variable-pitch enhances a steering response during slalom racing, for example. In a second arrangement, the pitch of the middle teeth is set at a maximum and the pitch is gradually decreased from the middle teeth toward both ends of the row of rack teeth. This variable-pitch reduces a steering force when a steering angle is large.

The VGR tooth profile of the variable-pitch racked bar is formed by complicatedly curved tooth faces which mesh with a helical pinion provided with an involute curve. During the manufacture of the variable-pitch racked bars, the curvature of each rack tooth face unavoidably, slightly deviates from the originally designed curvature. These deviations adversely affect the meshing condition of the helical pinion in each rack tooth, causing torque variances and increasing play in the steering operation.

SUMMARY OF THE INVENTION

Wherefore, an object of the present invention is to gradate torque variances in the variable-pitch region of a variable-pitch racked bar and decrease the play in the steering operation.

To attain this and other objects, the present invention provides a variable-pitch racked bar having a variable-pitch region in which the pitch of a row of rack teeth meshing with a helical pinion gradually increases or decreases. In the variable-pitch region, an effective meshing width of a pinion engagement portion of the rack teeth gradually decreases from the middle of the row of rack teeth toward the end thereof.

As the effective meshing width narrows, the contact position of the rack tooth with the helical pinion adjusts towards the center of the tooth width. As a result, the helical pinion firmly meshes with the center of the rack tooth, thereby assuring the engagement of the pinion and the racked bar, and undesirably torque variances are suppressed, thereby improving the feel of the steering operation.

Also, in a fixed pitch region, the effective meshing width can be gradually decreased. In this structure, the effective meshing width can be smoothly varied along the entire length of the row of rack teeth of the racked bar. The variable-pitch racked bar having such structure is easy to design and manufacture.

The effective meshing width of the variable-pitch racked bar is gradually decreased, preferably by adjusting the position of a shoulder of each rack tooth while maintaining a constant root width of each rack tooth. In this manner, only the effective meshing width can be gradually decreased without substantially decreasing the strength of the rack teeth. By moving the position of the shoulder of each rack tooth inwards, the effective meshing width of each rack tooth can be decreased.

In a preferred embodiment, the variable-pitch racked bar is a hollow so that even when the racked bar is deformed, a defective contact of the rack teeth with the pinion can be avoided, thereby smoothing torque variances.

The above and other features of the invention including various and novel details of construction and combination of parts will now be more particularly described with reference to the accompanying drawings and pointed out in the claims. It will be understood that the particular variable-pitch racked bar embodying the invention is shown by way of illustration only and not as a limitation of the invention. The principles and features of this invention may be employed in varied and numerous embodiments without departing the scope of the invention.

DETAILED DESCRIPTION OF THE PREFERRED EMBODIMENTS

An embodiment of a variable-pitch racked bar for use in a vehicle steering device is now explained. A row of rack teeth of the variable-pitch racked bar mesh with a helical pinion attached to a lower end of a steering shaft.

Figure 1A:
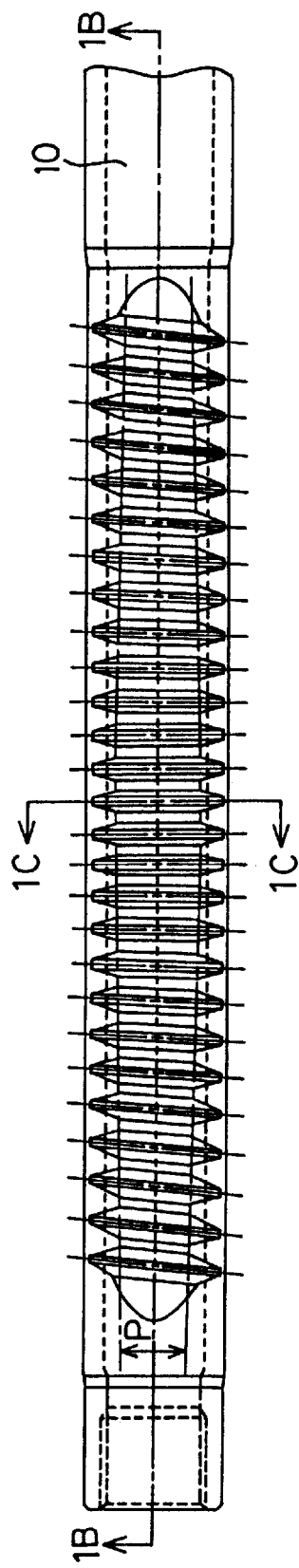
FIG. 1A is a plan view of a variable-pitch racked bar made in accordance with the present invention.
Figure 1B:
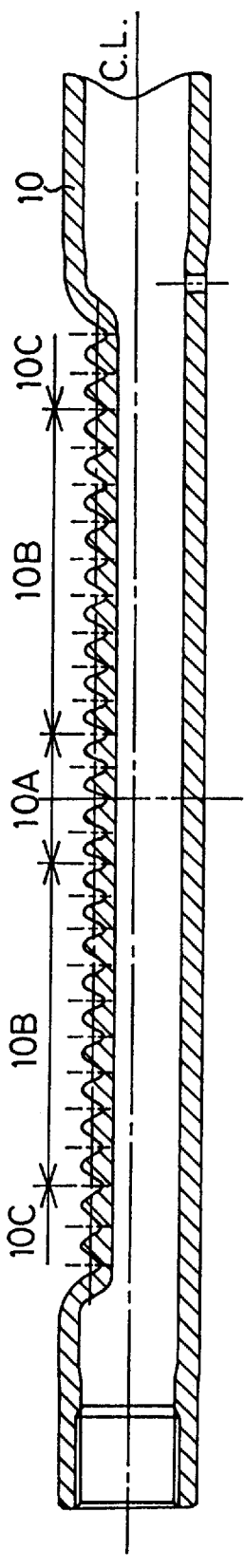
FIG. 1B is a cross-sectional view along line 1B—1B in FIG. 1A.

As shown in FIG. 1B, a variable-pitch racked bar 10 has a middle fixed pitch region 10A and two end fixed pitch regions 10C along the row of rack teeth. Variable-pitch regions 10B are provided between the fixed pitch region 10A and 10C. The middle fixed pitch region 10A has a small pitch to decrease response to the operation of a steering wheel, thereby avoiding excess response at the beginning of a steering operation. Both end fixed pitch regions 10C are large pitched to increase response to operation of the steering wheel, thereby enhancing response to a large-angled steering operation. The pitch of variable-pitch regions 10B gradually increase, thereby smoothly connecting the small-pitched region 10A with the large-pitched regions 10C.

Figure 1C:
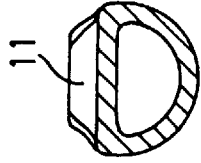
FIG. 1C is a cross-sectional view along line 1C—1C in FIG. 1A.

In the variable-pitch racked bar 10, as shown in FIG. 1A, an effective meshing width P of the rack, with a pinion engaging portion, is continuously decreased from the middle of the row of rack teeth towards both ends. The effective meshing width P is gradually decreased by moving the position of the shoulder of each rack tooth 11 inwardly, as shown in FIG. 1C. In other words, an elongate length of a tooth tip defined by the two shoulders of each rack tooth gradually decreases. This arrangement provides a constant root width of each rack tooth, even for the teeth at both ends of the row of rack teeth.

Figure 2A:
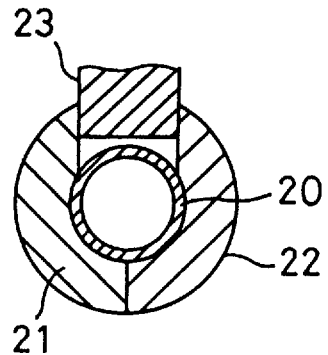
FIGS. 2A–2E are views showing the variable-pitch racked bar at different steps of manufacture.
Figure 2B:
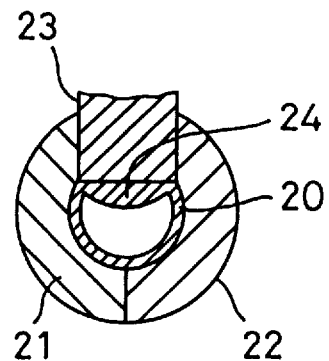
Figure 2C:
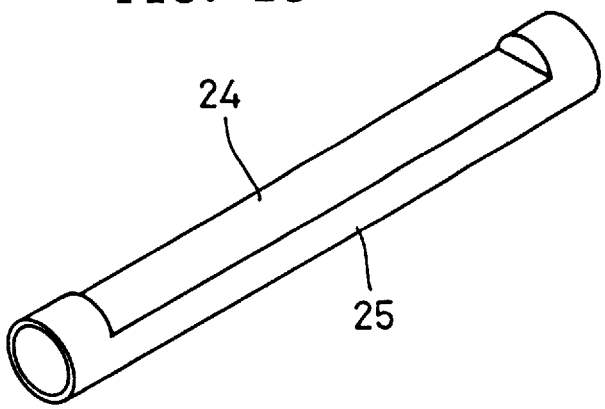
Figure 2D:
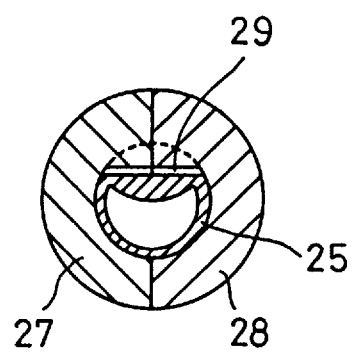
Figure 2E:
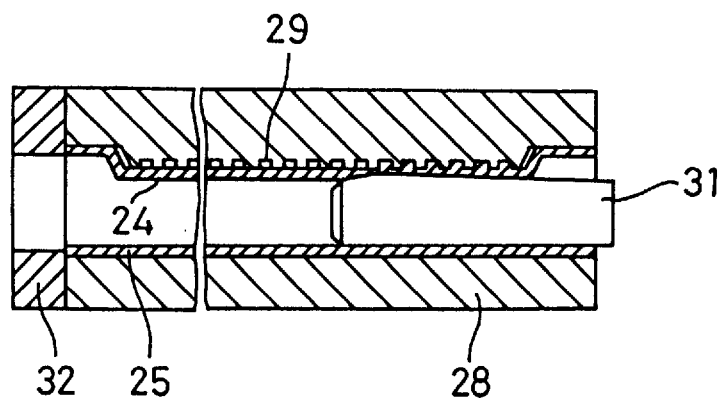

The manufacture of a variable-pitch racked bar 10 is now explained referring to FIGS. 2A–2E. First, as shown in FIG. 2A, a hollow pipe 20 is set in a pair of split molds 21 and 22 having an open upper end. As shown in FIG. 2B, the hollow pipe 20 is pressed by a press mold 23 having a flat bottom face, thereby forming a primary compact 25 having a flat region 24 therein, as shown in FIG. 2C. Subsequently, as shown in FIG. 2D, the primary compact 25 is set in a second pair of split molds 27 and 28. The second pair of split molds 27 and 28 is configured such that when the split molds 27 and 28 are closed, a cavity 29 formed therebetween has indentations corresponding to the VGR tooth profile. As shown in FIG. 2E, a segmental punch 31 having a height larger than the cross-sectional height of flat region 24 is inserted into one open end of the second pair of split molds 27 and 28. The other end of the split molds 27 and 28 is provided with an annular member 32 for receiving an end face of the primary compact 25. The segmental punch 31 presses the flat region 24 into the cavity 29 to form the corresponding VGR tooth profile.

The split molds 27 and 28 are configured so that the cavity 29 defined therein forms rack teeth which have a gradually decreasing effective meshing width. Alternatively, the split molds 27 and 28 can be configured so that the cavity 29 defined therein forms rack teeth irrespective of the gradually decreasing effective meshing width. In this configuration, the rack teeth are ground to adjust the shoulder position of each rack tooth 11.

In the aforementioned method, at the step of forming the primary compact 25, an upper face of hollow pipe 20 exposed through the open upper end of the split molds 21 and 22 is heated and softened, and is pressed against with the press mold 23. During this process, as shown in FIG. 2B, the underside of flat region 24 is made convex.

Afterwards, the primary compact 25 is cold formed with the segmental punch 31, such that a complicated, curved tooth face is prevented from being thermally deformed.

The variable-pitch racked bar 10 is assembled with the helical pinion such that the helical pinion firmly and closely meshes with each rack tooth 11 at the middle fixed pitch region 10A.

Figure 3A:
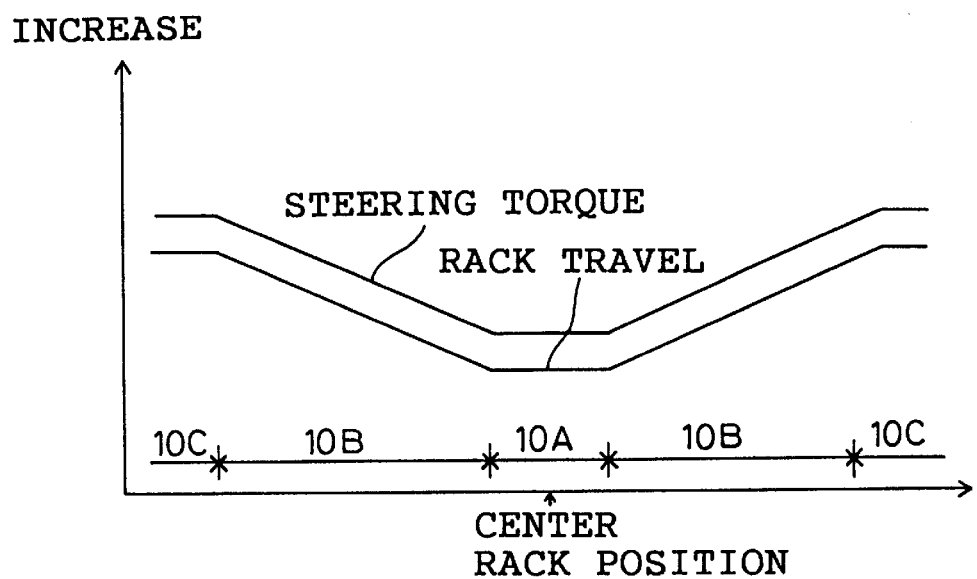
FIGS. 3A and 3B are graphs showing the performance and effectiveness of the racked bar made in accordance of the present invention.

The relationship between the rack travel of the variable-pitch racked bar 10 and a steering torque is shown in FIG. 3. The rack travel is the distance by which the racked bar 10 is moved every time the helical pinion is rotated by a specified angle. In the variable-pitch region 10B, the rack travel gradually increases due to the gradually increasing pitch of the rack teeth. Accordingly, the steering torque also gradually increases. As the steering torque and rack travel change, the effective meshing width of the rack teeth gradually decreases. Consequently, the meshing strength between the helical pinion and the rack teeth is smoothly increased.

Figure 3B:
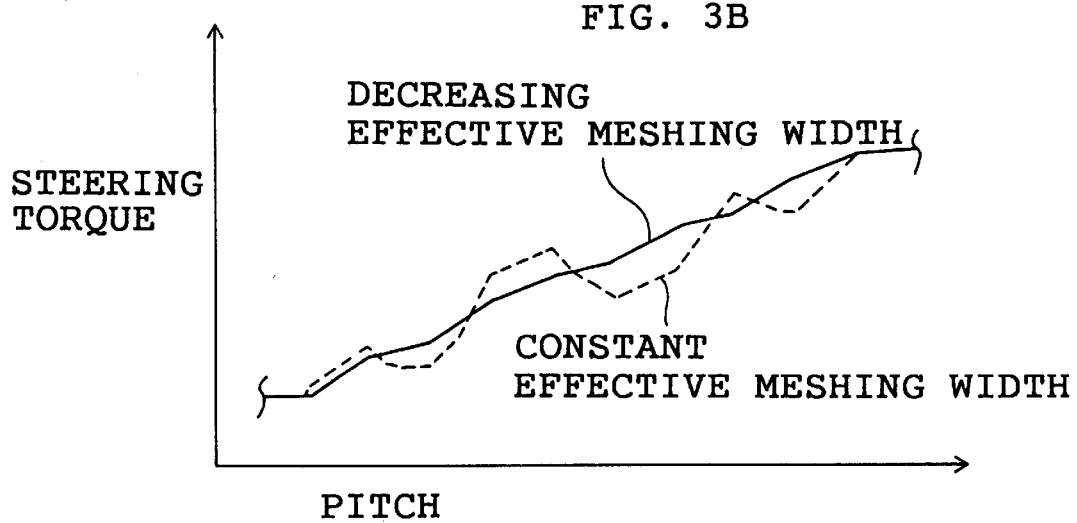

As shown by a solid line in FIG. 3B, the decreasing effective meshing width of the rack teeth in the variable-pitch region 10B allows the steering torque to be gradually and smoothly increased. As shown by a dotted line in FIG. 3B, when the pitches are varied but the effective meshing width is unchanged, the steering torque varies sporadically, thereby giving a feeling of discrepancies to a driver. In the embodiment, the steering torque is regularly varied and the feeling of discrepancies is prevented.

The aforementioned effectiveness of the present invention is enhanced by the hollow racked bar of the embodiment that can attenuate any deformation. Since the racked bar is hollow, the row of rack teeth can be easily deflected, thereby improving the meshing of the helical pinion and the rack teeth, which can also be improved by providing backlashes in the meshing.

This invention has been described above with reference to the preferred embodiment as shown in the figures. Modifications and alterations may become apparent to one skilled in the art upon reading and understanding the specification. Despite the use of the embodiment for illustration purposes, the invention is intended to include all such modifications and alterations within the spirit and scope of the appended claims.

What is claimed is:

1. A variable-pitch racked bar for engagement with a pinion, said variable-pitch bar having a variable-pitch region in which the pitch of rack teeth varies; said variable pitch rack bar comprising
   an elongate member; and
   a row of rack teeth for engagement with the pinion, said row of rack teeth being formed in a surface of said elongate member, said row of rack teeth having at least one variable-pitch region;
   each rack tooth in said row of rack teeth having an effective meshing width for meshing with the pinion, said effective meshing width of each rack tooth in said at least one variable-pitch region gradually decreasing in width from a middle of said row of rack teeth towards an end region of said row of rack teeth.

2. A variable-pitch racked bar for meshing with a pinion of a vehicle steering device, comprising:
   an elongate member; and
   a row of rack teeth being formed in a surface of said elongate member, said row of rack teeth having at least one variable-pitch region, and each rack tooth having a root and two spaced apart shoulders extending from said root to define a tooth tip;
   wherein said tooth tips of said rack teeth located in said variable-pitch region have a decreasing elongate length, such that a rack tooth located adjacent a middle of said row of rack teeth has the longest length and a rack tooth located remote from said middle has the shortest length.

3. A variable-pitch racked bar according to claim 2, wherein said row of rack teeth has a middle region, and said rack teeth located in said middle region have a first fixed pitch.

4. A variable-pitch racked bar according to claim 3, wherein said row of rack teeth has two variable-pitch regions, and one variable-pitch region is located on each side of said middle region.

5. A variable-pitch racked bar according to claim 4, wherein said row of rack teeth has two end regions located remote from said middle region, one end region is located on each side of said middle region such that one variable-pitch region separates said middle region from said end region, and said rack teeth located in said two end regions have a second fixed pitch.

6. A variable-pitch racked bar according to claim 5, wherein said first fixed pitch is less than said second fixed pitch, and said rack teeth located in said two variable-pitch regions have an increasing pitch from a rack tooth adjacent said middle region to a rack tooth adjacent said end region.

7. A variable-pitch racked bar according to claim 6, wherein said tooth tips of said row of rack teeth have a decreasing elongate length, such that a rack tooth located at said middle of said row of rack teeth has the longest length and a rack tooth located remote from said middle has the shortest length.

8. A variable-pitch racked bar according to claim 2, wherein said roots of said rack teeth have a constant elongate width.

9. A variable-pitch racked bar according to claim 2, wherein said two spaced apart shoulders of each rack tooth symmetrically extend from said root such that said elongate length of said tooth tip is centered over said root.

10. A variable-pitch racked bar according to claim 2, wherein said elongate member is hollow.

* * * * *